(No Model.)

F. BATEMAN.
DRAFT EQUALIZER.

No. 245,432. Patented Aug. 9, 1881.

Witnesses:
Hubert Howson
Henry Howson Jr.

Inventor:
Frank Bateman
by his Attorneys
Howson & Son

United States Patent Office.

FRANK BATEMAN, OF SPRING MILLS, NEW JERSEY, ASSIGNOR OF ONE-HALF TO EDWARD S. BATEMAN, OF SAME PLACE.

DRAFT-EQUALIZER.

SPECIFICATION forming part of Letters Patent No. 245,432, dated August 9, 1881.

Application filed November 24, 1880. (No model.)

*To all whom it may concern:*

Be it known that I, FRANK BATEMAN, a citizen of the United States, residing in Spring Mills, Camden county, New Jersey, have invented an Improvement in Draft-Equalizers, of which the following is a specification.

My invention relates to a draft-equalizer intended for use in connection with gang-plows or cultivators having a central arch or arches for the passage of the standing crop, the main object of my invention being to so construct such a draft-equalizer that the draft-levers may be connected directly to each other without the intervention of the usual double-tree.

Figure 1:
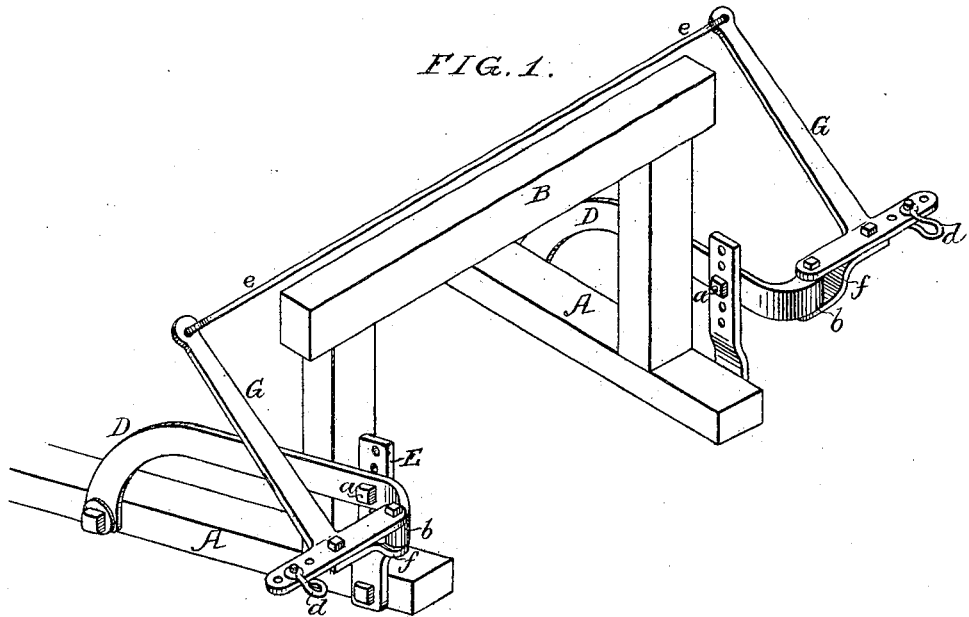
Figure 2:
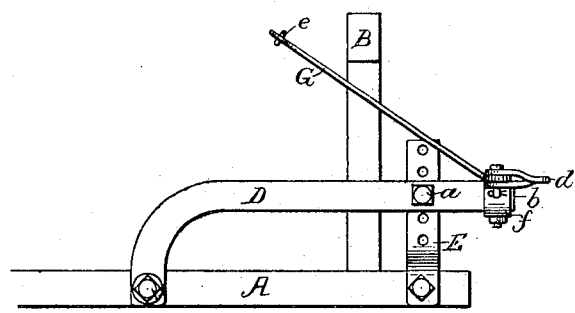

In the accompanying drawings, Figure 1 is a perspective view of sufficient of a gang-plow or cultivator to illustrate my invention, and Fig. 2 a side view.

A A represent the opposite side beams of the frame of the machine, and B the forward arch.

To each of the side beams, A, is hung an arm, D, the front end of which may be raised and lowered, and secured in position after adjustment by means of a retaining-bolt, *a*, adapted to an opening in the arm and to one of a series of openings in a vertical plate, E, secured to the beam A.

On the front end of each arm D is formed an eye, *b*, for the reception of the pivot-pin of a bell-crank lever, G, the short arms of said levers being furnished with draft-hooks *d*, and the long arm of each lever being bent upward, so that said arms may be connected together by means of a transverse rod, *e*, in the rear of and preferably in line with the top bar of the arch B of the frame. By this means the swinging of the levers G on their pivots, owing to unequal draft upon the same, causes a lateral movement of the connecting-rod *e*, there being no vertical movement to interfere with the passage of the standing crop beneath the arch of the frame. My improved construction is also simpler and more economical than those in which doubletrees pivoted to the top bar of the arch are employed.

The pivot of each lever G is steadied by means of a plate, *f*, projecting from the under side of the lever and extending to the bottom of the eye *b* of the arm D, the vertical adjustment of the latter being also of advantage in adapting the plow or cultivator to the particular class of work to be done.

I claim as my invention—

1. The combination of the side beams and forward arch of a plow or cultivator frame with the bell-crank draft-levers G, the long arms of which are bent upward, and are directly connected by a transverse rod, *e*, in the rear of the arch, as set forth.

2. The combination of the side beams and forward arch of the frame, the bell-crank draft-levers G, having upwardly-bent long arms, the transverse connecting-rod *e*, the pivoted arms D, carrying the levers, and the retaining-plates E, as specified.

In testimony whereof I have signed my name to this specification in the presence of two subscribing witnesses.

FRANK BATEMAN.

Witnesses:
JAMES F. TOBIN,
HARRY SMITH.